(12) United States Patent
Choi et al.

(10) Patent No.: US 8,390,237 B2
(45) Date of Patent: Mar. 5, 2013

(54) STARTING CONTROL APPARATUS AND METHOD FOR MOTOR

(75) Inventors: Jae-Hak Choi, Seoul (KR); Jang-Ho Shim, Seoul (KR); Sung-Ho Lee, Gyeonggi-Do (KR); Jin-Soo Park, Incheon (KR); Jae-Min Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 1158 days.

(21) Appl. No.: 12/226,920

(22) PCT Filed: Apr. 26, 2007

(86) PCT No.: PCT/KR2007/002053
§ 371 (c)(1),
(2), (4) Date: Oct. 31, 2008

(87) PCT Pub. No.: WO2007/126252
PCT Pub. Date: Nov. 8, 2007

(65) Prior Publication Data
US 2009/0160393 A1 Jun. 25, 2009

(30) Foreign Application Priority Data
May 2, 2006 (KR) .................. 10-2006-0039680

(51) Int. Cl.
*H02K 17/30* (2006.01)
*H02P 1/16* (2006.01)

(52) U.S. Cl. ........................... 318/778; 318/794
(58) Field of Classification Search .......... 318/782–786, 318/794, 795, 778, 753, 400.11
See application file for complete search history.

(56) References Cited

U.S. PATENT DOCUMENTS

| | | | | |
|---|---|---|---|---|
| 4,161,681 A * | 7/1979 | Rathje | | 318/783 |
| 4,387,330 A * | 6/1983 | Zigler | | 318/788 |
| 5,053,908 A * | 10/1991 | Cooper et al. | | 361/24 |
| 5,218,283 A * | 6/1993 | Wills et al. | | 318/748 |
| 5,712,551 A * | 1/1998 | Lee | | 318/466 |
| 7,071,650 B2 * | 7/2006 | Ilda | | 318/785 |
| 7,102,264 B2 * | 9/2006 | Yanashima et al. | | 310/156.57 |
| 7,239,109 B2 * | 7/2007 | Park et al. | | 318/789 |
| 7,612,519 B2 * | 11/2009 | Smith | | 318/788 |
| 8,067,920 B2 * | 11/2011 | Choi et al. | | 318/785 |
| 2001/0009360 A1 * | 7/2001 | Jin | | 318/801 |
| 2004/0084984 A1 * | 5/2004 | Yanashima et al. | | 310/156.08 |
| 2005/0231151 A1 * | 10/2005 | Ilda | | 318/785 |
| 2005/0253474 A1 * | 11/2005 | Yanashima et al. | | 310/162 |
| 2006/0038528 A1 * | 2/2006 | Park et al. | | 318/786 |
| 2006/0140789 A1 * | 6/2006 | Smith | | 417/410.1 |
| 2009/0108796 A1 * | 4/2009 | Choi et al. | | 318/795 |

FOREIGN PATENT DOCUMENTS

| | | |
|---|---|---|
| JP | 61-164450 | 7/1986 |
| JP | 6-319282 A | 11/1994 |
| JP | 2540130 B2 | 10/1996 |

* cited by examiner

*Primary Examiner* — Eduardo Colon Santana
(74) *Attorney, Agent, or Firm* — McKenna Long & Aldridge LLP

(57) ABSTRACT

Entry of a synchronous speed of a rotor can be facilitated by increasing a starting torque by adjusting a magnetization application time for magnetizing the rotor according to whether or not a starting capacitor is used. The present invention includes: a control unit that outputs a control signal for controlling an application time of a magnetizing current according to whether or not a starting capacitor is used; and a switch that supplies power to an exciting coil according to the control signal outputted from the control unit.

17 Claims, 4 Drawing Sheets

STARTING CONTROL APPARATUS AND METHOD FOR MOTOR

This application is a 371 national stage filing of International Application No. PCT/KR2007/002053, filed Apr. 26, 2007 and claims priority to Korean Application No. 10-2006-0039680, filed May 2, 2006, each of which are incorporated by reference in their entireties, as if fully set forth herein.

TECHNICAL FIELD

The present invention relates to a motor and, more particularly, to an apparatus and method for controlling starting of a motor capable of adjusting a magnetization application time for magnetizing a rotor according to whether or not a starting capacitor is used when started.

BACKGROUND ART

In general, in a motor used for a refrigerator, two exciter poles and an exciting coil are separately installed in a stator of a single-phase induction motor.

In the motor used for the refrigerator, two exciter polls and an exciting coil are separately installed at the stator in the single-phase induction motor including a core, a main winding (main coil) and an auxiliary winding (sub-coil).

A rotor of the motor used for the refrigerator includes a magnetic material that facilitates magnetizing and demagnetizing.

An excitation control circuit of the motor used for the refrigerator is a circuit that controls the exciting coil in order to magnetize the magnetic material.

The excitation control circuit includes a feedback coil, a capacitor, a speed response switch and an external controller.

FIG. 1 is schematic view showing the structure of the motor used for the refrigerator according to the related art, which includes a stator 20 and a rotor 40 having a magnetic material.

Here, the operation of the apparatus for controlling the motor of the refrigerator according to the related art will now described.

First, the control apparatus controls such that power is applied to the main winding and the auxiliary winding of the stator 20 of the motor, according to which the rotor 40 is rotated by the power applied to the main winding and the auxiliary winding.

Next, when the rotor 40 reaches a certain speed (synchronous speed 75% to 80%), the exciting coil is excited to magnetize the magnetic material 30 to the rotor 40.

In the apparatus for controlling the motor used for the refrigerator as described above, when started, the rotor including the magnetic material is magnetized by exciting the exciting coil at 75% to 80% of the synchronous speed, and then, the rotor is changed to the synchronous speed, causing a problem that the starting torque is small.

DISCLOSURE OF THE INVENTION

Therefore, an object of the present invention is to provide an apparatus and method for controlling starting of a motor capable of facilitating entry of a synchronous speed of a rotor by increasing a starting torque by adjusting a magnetization application time for magnetizing the rotor according to whether or not a starting capacitor is used.

To achieve these and other advantages and in accordance with the purpose of the present invention, as embodied and broadly described herein, there is provided an apparatus for controlling starting of a motor including: a control unit that outputs a control signal for controlling an application time of a magnetizing current according to whether or not a starting capacitor is used; and a switch that supplies power to an exciting coil according to the control signal outputted from the control unit.

To achieve the above object, there is also provided an apparatus for controlling starting of a motor including: a main coil connected in parallel with a power source; a sub-coil connected in parallel with the main coil; a PTC (Positive Temperature Coefficient) that controls starting of the sub-coil; a starting capacitor that matches impedance corresponding to frequency characteristics of the sub-coil at a synchronous speed; a control unit that outputs a control signal for controlling an application time of a magnetizing current according to whether or not the starting capacitor is used; and a switch that supplies power to an exciting coil according to the control signal outputted from the control unit.

To achieve the above object, there is also provided a method for controlling starting of a motor including: controlling applying of a magnetizing current according to whether or not a starting capacitor is used.

The controlling of applying of the magnetizing current includes: applying the magnetizing current before a PTC operation time, when the starting capacitor is used.

MODES FOR CARRYING OUT THE PREFERRED EMBODIMENTS

An apparatus and method for controlling starting of a motor capable of facilitating entry of a synchronous speed of a rotor by increasing a starting torque by adjusting a magnetization application time for magnetizing the rotor according to whether or not a starting capacitor is used, according to the exemplary embodiment of the present invention will now be described with reference to the accompanying drawings.

By including a magnetic material that can be magnetized in a rotor with a conductive bar, the motor can be operated as an inductor motor until speed of the rotor reaches a synchronous speed of a rotation magnetic field, and can be applicable to an excitation motor that magnetizes the magnetic material to reach the synchronous speed of the rotation magnetic field.

Figure 1:
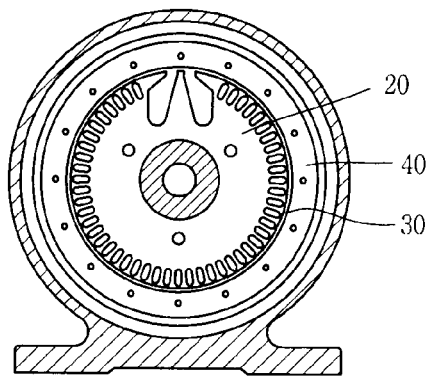
FIG. 1 is a schematic view showing the structure of a motor of a refrigerator according to the related art.
Figure 2:
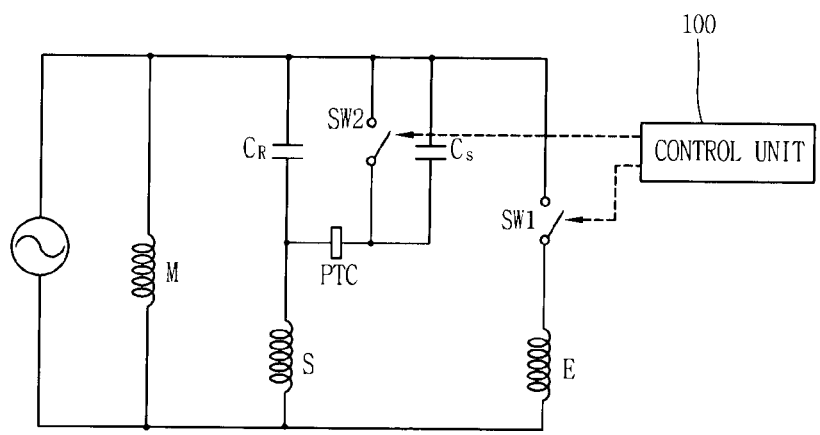
FIG. 2 is a circuit diagram showing the construction of an apparatus for controlling starting of a motor according to an exemplary embodiment of the present invention.

FIG. 2 is a circuit diagram showing the construction of an apparatus for controlling starting of a motor according to an exemplary embodiment of the present invention.

As shown in FIG. 2, it includes a main coil, a sub-coil, a starting capacitor Cs, an operation capacitor Cr, an exciting coil, a switch SW1, and a control unit 100.

In order to start the rotor of the self-magnetizing motor, the starting capacitor Cs applies a current with a fast phase to the sub-coil, and accordingly, the rotor is started by a magnetic field and an induction current generated from the sub-coil.

The operation capacitor Cr applies a current with a phase slower by 90° than the current flowing at the sub-coil, and accordingly, a rotation magnetic field is generated from the stator by the current flowing at the main coil, and thus, the rotor is rotated upon receiving power continuously.

When the starting capacitor Cs is used, the control unit 100 outputs a control signal for applying a magnetizing current before a PTC (Positive Temperature Coefficient) operation time, and when the starting capacitor Cs is not used, the control unit 100 outputs a control signal for applying the magnetizing current after the PTC operation time.

In this case, when the starting capacitor Cs is used, the control unit 100 may output the control signal for applying the magnetizing current to the magnetic material within 0.8 seconds before the PTC operation time.

Here, the reference for determining the time within the 0.8 seconds before the PTC operation time can be set by using a time point at which the motor is started as a reference.

In addition, when the starting capacitor Cs is not used, the control unit 100 outputs a control signal for controlling such that the magnetizing current is applied to the magnetic material after 0.8 seconds after the PTC is operated.

Here, the time after 0.8 seconds after the PTC is operated can be determined by sensing the operation of the PTC.

The switch SW1 is formed of a relay or a bi-directional conductive power semiconductor, and applies the magnetizing current to the exciting coil or cuts off the magnetizing current according to the control signal outputted from the control unit 100.

In addition, when whether or not the starting capacitor Cs is used is selected, the control unit 100 controls such that power is applied to the PTC through the starting capacitor Cs or power is directly applied to the PTC.

In this case, a switch SW2, which is controlled to be turned on or off by the control unit 100, is connected in parallel with the starting capacitor Cs.

The operation of the present invention will now be described.

First, in order to start the rotor of the self-magnetizing motor, the starting capacitor Cs applies a current with a fast phase to the sub-coil, and accordingly, the rotor is started by the magnetic field and an induction current generated from the sub-coil.

Next, the operation capacitor Cr applies a current with a phase slower by 90° than that of the current flowing at the sub-coil to the main coil, and accordingly, the stator generates a rotation magnetic field by the current flowing at the main coil, so the rotor can be rotated upon receiving power continuously.

Figure 3:
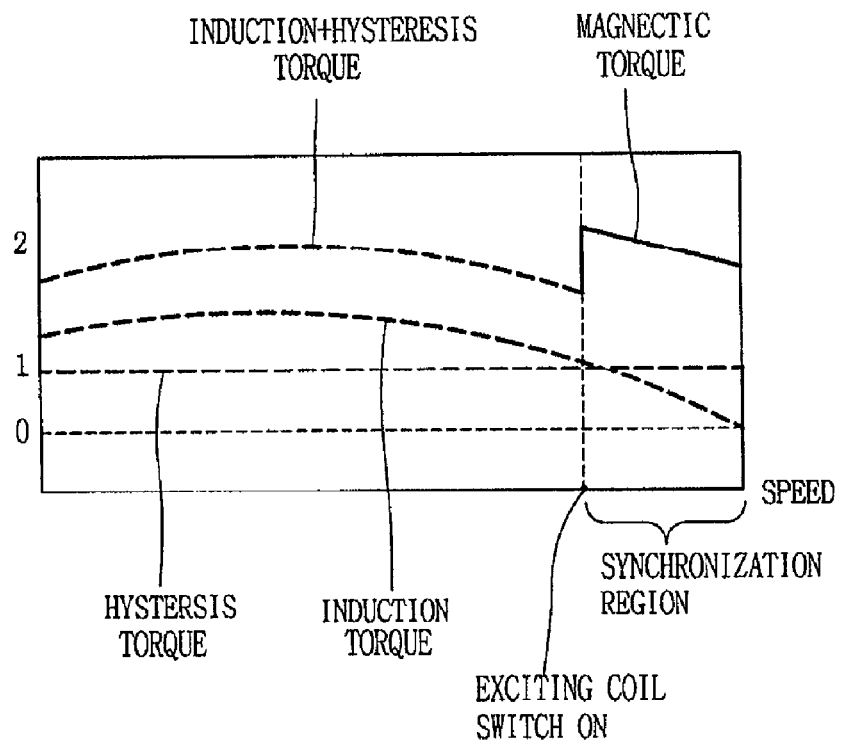
FIG. 3 is a view showing a speed-torque curved line of the motor according to the exemplary embodiment of the present invention.

In this case, because the rotor body is made of a ferromagnetic substance of high permeability, the magnetic field generated by the main coil and the subcoil magnetizes the rotor, and accordingly, the rotor is rotated upon receiving a hysteresis torque (H) by a hysteresis effect as shown in FIG. 3.

Namely, as shown in FIG. 3, the rotor receives the hysteresis torque (H) and an induction torque (I) so as to be rotated.

If the speed of the rotor becomes the same as a synchronous speed (3,600 rpm) of the rotation magnetic field, the rotor is always slower than the synchronous speed of the rotation magnetic field. Namely, a slip phenomenon occurs.

At this time, when a strong current is applied to the exciting coil, a strong magnetic flux generated by the exciting coil is transferred to a magnetic material surrounding an outer circumferential surface of the rotor to magnetize the magnetic material.

Then, the magnetic material is magnetized to become a permanent magnet which is rotated along the rotation magnetic field which has been already generated at the stator.

In this case, although the rotation speed of the rotor is gradually increased to be the same as the synchronous speed of the rotation magnetic field, the permanent magnet can be continuously rotated along the rotation magnetic field, so the rotary force of the rotor will not be reduced.

Here, in the present invention, entry (or start) of synchronization can be facilitated by adjusting condition(s) and application time(s) for applying magnetization of the magnetic material according to whether or not the sub-coil is connected with the starting capacitor Cs to thus increase the starting torque.

Namely, when whether or not the starting capacitor Cs is used is selected, the control unit 100 applies power to the PTC through the starting capacitor Cs, or directly applies power to the PTC.

Figure 4:
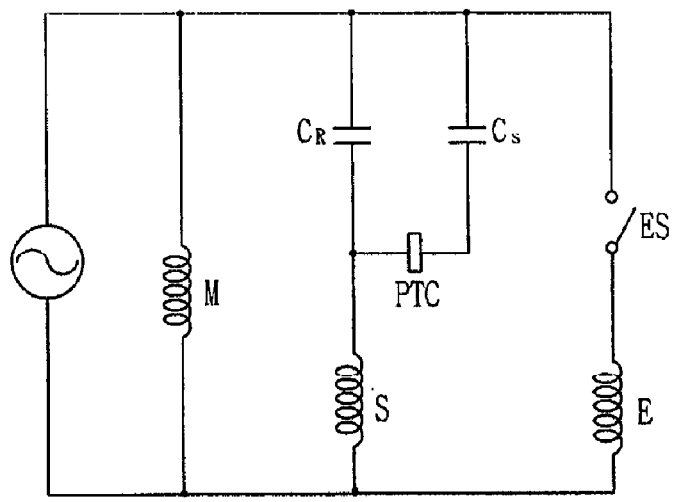
FIG. 4 is a circuit diagram showing a current path when a starting capacitor is used in FIG. 2.

First, when the starting capacitor Cs is used, the control unit 100 outputs a control signal for turning off the switch SW2 connected in parallel with the starting capacitor Cs, and accordingly, the switch SW2 is turned off and power is applied to the PTC through the starting capacitor Cs as shown in FIG. 4.

At this time, when the starting capacitor Cs is used, the control unit outputs a control signal for applying the magnetizing current to the magnetic material before the PTC operation time.

In a preferred embodiment of the present invention, when the starting capacitor Cs is used, the control unit 100 outputs the control signal for applying the magnetizing current to the magnetic material within 0.8 seconds before the PTC operation time.

Here, the reference for determining the time within the 0.8 seconds before the PTC operation time can be set by using a time point at which the motor is started as a reference.

Figure 5:
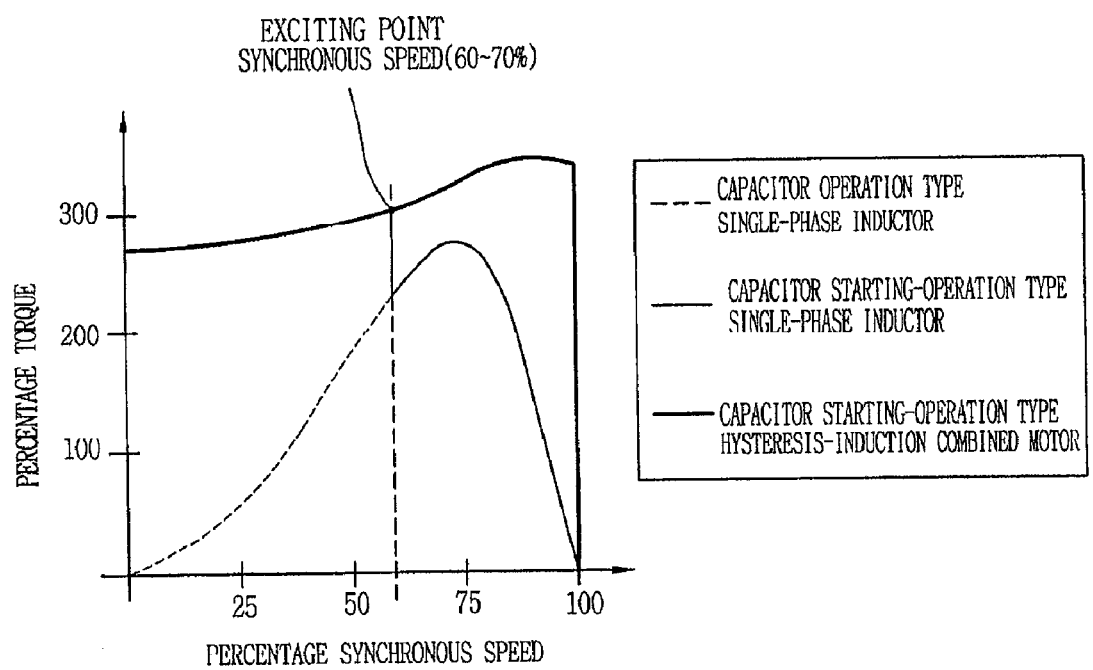
FIG. 5 is a graph showing a speed-torque curved line when the starting capacitor is used.

Accordingly, the switch SW1 is conducted under the control of the control unit 100, and as shown in FIG. 5, the magnetizing current is applied at a maxim torque point of 60% to 70% of the synchronous speed.

At this time, the conduction time of the switch SW1 is preferably 1 second, and the magnetizing current of one cycle is applied to the exciting coil through the conducted switch SW1.

Figure 6:
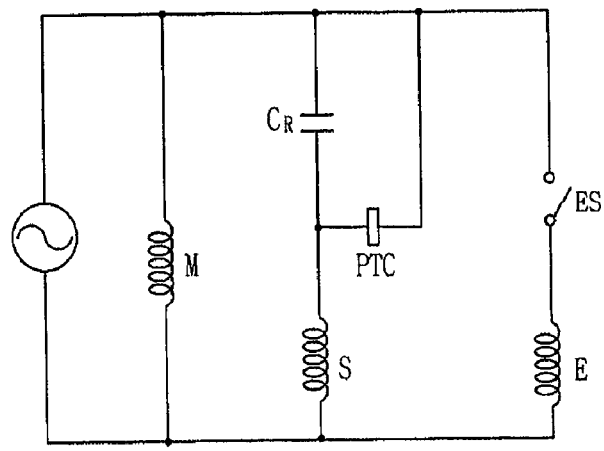
FIG. 6 is a circuit diagram showing a current path when the starting capacitor is not used in FIG. 2.

Reversely, when the starting capacitor Cs is not used, the control unit 100 outputs a control signal for turning on the switch connected in parallel with the starting capacitor Cs, and accordingly, the switch SW2 is turned on and power is immediately applied to the PTC as shown in FIG. 6.

In this state, when the starting capacitor Cs is not used, the control unit 100 outputs a control signal for applying the magnetizing current to the magnetic material after the PTC operation time.

In a preferred embodiment of the present invention, when the starting capacitor Cs is not used, the control unit 100 outputs the control signal in order to control such that the magnetizing current is applied to the magnetic material after 0.8 seconds after the PTC is operated.

Here, the time after 0.8 seconds after the PTC is operated can be determined by sensing the operation of the PTC.

Figure 7:
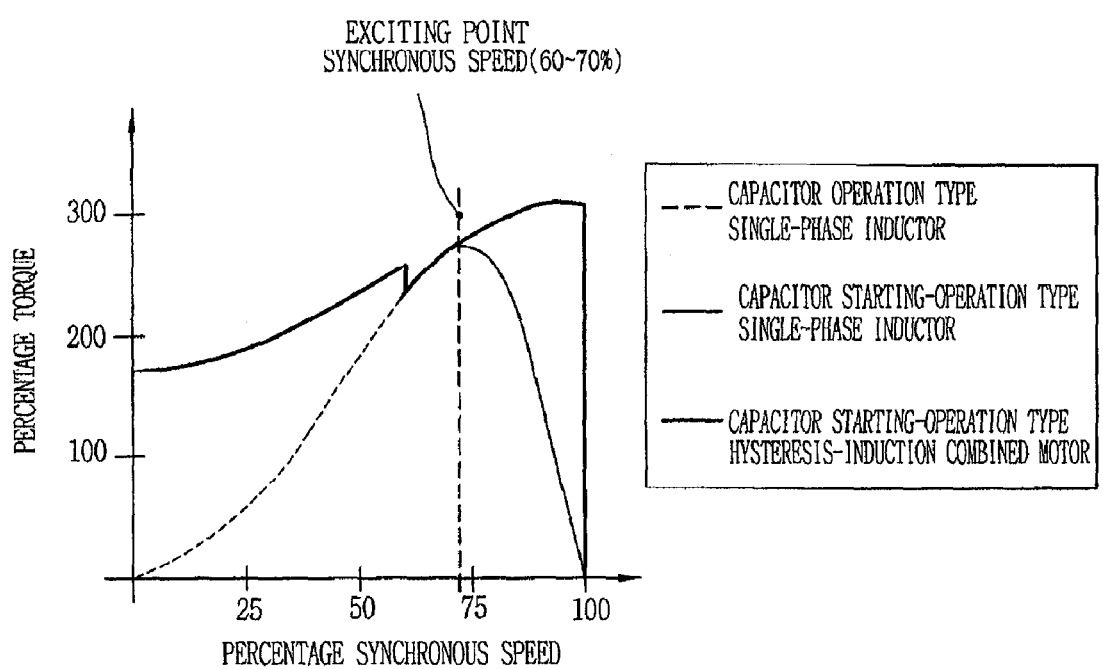
FIG. 7 is a graph showing a speed-torque curved line when the starting capacitor is not used.

Then, the switch SW1 is conducted under the control of the control unit 100 and applies the magnetizing current at the maximum torque point of 70% to 80% of the synchronous speed as shown in FIG. 7.

Accordingly, the exciting coil is excited at the 70% to 80% of the synchronous speed to increase the starting torque.

In this case, the conduction time of the switch SW1 is preferably 1 second, and the magnetizing current of one cycle is applied to the exciting coil through the conducted switch SW1.

That is, in the present invention, when the starting capacitor is used to start the motor, power is applied to the PTC through the starting capacitor and the magnetizing current is applied to the magnetic material within a pre-set time before the operation of the PTC to increase the starting torque, whereby the rotor can easily enter the synchronous speed.

In addition, when the starting capacitor is not used to start the motor, power is directly applied to the PTC and then the magnetizing current is applied to the magnetic material when a pre-set time lapses after the PTC is operated to increase the starting torque, whereby the rotor can easily enter the synchronous speed.

As so far described, the apparatus and method for controlling starting of the motor according to the present invention have the following advantages. That is, the magnetization application time is controlled according to whether or not the starting capacitor is used, to increase the starting torque. Thus, the magnetization degree of the rotor including the magnetic material can be improved to allow the rotor to quickly enter the synchronous speed to thereby improve the operation efficiency of the motor.

The invention claimed is:

1. An apparatus for controlling starting of a motor comprising:
a control unit that outputs a control signal for controlling an application time of a magnetizing current according to whether a starting capacitor is used; and
a switch connected in parallel with the starting capacitor that supplies power to the starting capacitor according to the control signal outputted from the control unit wherein,
when whether the starting capacitor is used is selected, the control unit applies power to a PTC (Positive Temperature Coefficient) through the starting capacitor or applies power directly to the PTC by turning on/off the switch.

2. The apparatus of claim 1, wherein when the switch is turned off and the starting capacitor is used, the control unit outputs a control signal for applying the magnetizing current to a magnetic material before a PTC operation time.

3. The apparatus of claim 1, wherein when the switch is turned on the starting capacitor is not used, the control unit outputs a control signal for applying the magnetizing current to the magnetic material after the PTC operation time.

4. The apparatus of claim 1, wherein the switch is formed of a relay or a bi-directionally conductive power semiconductor.

5. The apparatus of claim 1, wherein when the switch is turned off and the starting capacitor is used, the control unit outputs a control signal for controlling such that the magnetizing current is applied to the magnetic material within a pre-set time before the operation time of the PTC.

6. The apparatus of claim 1, wherein when the switch is turned on, the control unit outputs a control signal for controlling such that the magnetizing current is applied to the magnetic material after a pre-set time after the PTC is operated.

7. An Apparatus for controlling starting of a motor comprising: a main coil connected in parallel with a power source; a sub-coil connected in parallel with the main coil; a PTC (Positive Temperature Coefficient) that controls starting of the sub-coil; and a starting capacitor that matches impedance corresponding to frequency characteristics of the sub-coil at a synchronous speed;
wherein, when whether the starting capacitor is used is selected, a control unit applies power to a PTC (Positive Temperature Coefficient) through the starting capacitor or applies power directly to the PTC by turning on/off a switch connected in parallel with the starting capacitor.

8. An apparatus for controlling starting of a motor comprising:
a main coil connected in parallel with a power source;
a sub-coil connected in parallel with the main coil;
a PTC (Positive Temperature Coefficient) that controls starting of the sub-coil;
a starting capacitor that matches impedance corresponding to frequency characteristics of the sub-coil at a synchronous speed;
a control unit that outputs a control signal for controlling an application time of a magnetizing current according to whether or not the starting capacitor is used;
and a first switch that supplies power to an exciting coil according to the control signal outputted from the control unit; and
a second switch connected in parallel with the starting capacitor that supplies power to the starting capacitor according to the control signal outputted from the control unit.

9. The apparatus of claim 8, wherein the control unit determines whether the starting capacitor is used according to whether the PTC connected in series with the starting capacitor is operated.

10. The apparatus of claim 8, wherein when the second switch is turned off and the starting capacitor is used, the control unit outputs a control signal for applying the magnetizing current before a PTC operation time.

11. The apparatus of claim 8, wherein when the second switch is turned on, the control unit outputs a control signal for applying the magnetizing current after the PTC operation time.

12. The apparatus of claim 8, wherein the first switch and second switch are formed of a relay or a bi-directionally conductive power semiconductor.

13. The apparatus of claim 8, wherein when the second switch is turned off and the starting capacitor is used, the control unit outputs a control signal for controlling such that the magnetizing current is applied within a pre-set time before the operation time of the PTC.

14. The apparatus of claim 8, wherein when the second switch is turned on, the control unit outputs a control signal for controlling such that the magnetizing current is applied when a pre-set time lapses after the PTC is operated.

15. A method for controlling starting of a motor comprising:
controlling of application of a magnetizing current according to whether a starting capacitor is used, by turning on/off a switch connected in parallel with the starting capacitor,
wherein controlling of application of the magnetizing current comprises applying the magnetizing current before the PTC operation time, when the switch is turned off and the starting capacitor is used; and
wherein the controlling of application of the magnetizing current comprises applying the magnetizing current after the PTC operation time, when the switch is turned on.

16. The method of claim 15, wherein the controlling of application of the magnetizing current comprises: applying the magnetizing current within the pre-set time before the PTC operation time.

17. The method of claim 15, wherein the controlling of application of the magnetizing current comprises: applying the magnetizing current after the pre-set time after the PTC is operated.

* * * * *